United States Patent
De Nunzio et al.

(10) Patent No.: US 11,215,469 B2
(45) Date of Patent: Jan. 4, 2022

(54) METHOD OF DETERMINING A ROUTE MINIMIZING THE ENERGY CONSUMPTION OF A VEHICLE USING A LINE GRAPH

(71) Applicant: IFP Energies nouvelles, Rueil-Malmaison (FR)

(72) Inventors: Giovanni De Nunzio, Oullins (FR); Laurent Thibault, Lyons (FR); Antonio Sciarretta, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 251 days.

(21) Appl. No.: 15/792,942

(22) Filed: Oct. 25, 2017

(65) Prior Publication Data
US 2018/0172462 A1   Jun. 21, 2018

(30) Foreign Application Priority Data
Oct. 25, 2016   (FR) ....................... 1660326

(51) Int. Cl.
*G01C 21/34* (2006.01)
*G01C 21/20* (2006.01)

(52) U.S. Cl.
CPC ......... *G01C 21/3469* (2013.01); *G01C 21/20* (2013.01); *G01C 21/343* (2013.01); *G01C 21/3446* (2013.01); *G01C 21/3492* (2013.01)

(58) Field of Classification Search
None
See application file for complete search history.

(56) References Cited

U.S. PATENT DOCUMENTS

| | | | |
|---|---|---|---|
| 2002/0107618 A1* | 8/2002 | Deguchi | B60W 50/0097 701/22 |
| 2003/0045999 A1* | 3/2003 | Joerg | G01C 21/3446 701/533 |
| 2006/0089787 A1* | 4/2006 | Burr | G01C 21/3469 701/533 |
| 2011/0060495 A1* | 3/2011 | Kono | G01C 21/3469 701/31.4 |

(Continued)

FOREIGN PATENT DOCUMENTS

| | | | | |
|---|---|---|---|---|
| EP | 0482256 A1 * | 4/1992 | | G01C 21/32 |
| EP | 1918895 A2 | 5/2008 | | |
| EP | 2669632 A2 | 12/2013 | | |

OTHER PUBLICATIONS

A. Sciarretta, G. De Nunzio and L. L. Ojeda, "Optimal Ecodriving Control: Energy-Efficient Driving of Road Vehicles as an Optimal Control Problem," in IEEE Control Systems Magazine, vol. 35, No. 5, pp. 71-90, Oct. 2015, doi: 10.1109/MCS.2015.2449688 (Year: 2015).*

(Continued)

*Primary Examiner* — David P. Merlino
(74) *Attorney, Agent, or Firm* — Fitch, Even, Tabin & Flannery LLP

(57) ABSTRACT

The present invention relates to a method of determining a route (ITI) minimizing the energy consumption of a vehicle, based on the use of a dynamic model (MOD) of the vehicle depending on the vehicle speed and acceleration, the construction of a line graph (GA) and a shortest path algorithm (ALG) suited for negative energies.

12 Claims, 3 Drawing Sheets

RR            GD            GA

(56) References Cited

U.S. PATENT DOCUMENTS

| | | | | |
|---|---|---|---|---|
| 2011/0196817 A1* | 8/2011 | Pryakhin | ................ | G01C 21/26 |
| | | | | 706/14 |
| 2011/0246019 A1* | 10/2011 | Mineta | .............. | B60W 50/0097 |
| | | | | 701/31.4 |
| 2012/0179362 A1* | 7/2012 | Stille | .................. | G01C 21/3469 |
| | | | | 701/410 |
| 2013/0096818 A1* | 4/2013 | Vicharelli | ............. | B60W 40/10 |
| | | | | 701/423 |
| 2013/0325335 A1* | 12/2013 | Kee | .................... | G01C 21/3469 |
| | | | | 701/527 |
| 2014/0156633 A1* | 6/2014 | Duan | .................. | G06F 16/2453 |
| | | | | 707/713 |
| 2014/0278103 A1* | 9/2014 | Daikoku | ............ | G01C 21/3469 |
| | | | | 701/533 |
| 2014/0350763 A1* | 11/2014 | Granato | ................ | B60W 10/06 |
| | | | | 701/22 |
| 2015/0046132 A1* | 2/2015 | Papajewski | ......... | B60W 40/107 |
| | | | | 703/2 |
| 2015/0266390 A1* | 9/2015 | Shin | .......................... | B60L 3/12 |
| | | | | 701/22 |
| 2016/0245662 A1* | 8/2016 | Rajagopalan | ...... | G01C 21/3469 |
| 2017/0146362 A1* | 5/2017 | Bai | .................... | G01C 21/3469 |
| 2017/0213137 A1* | 7/2017 | Geller | ................ | G01C 21/3484 |
| 2018/0045525 A1* | 2/2018 | Ara jo | ................ | G01C 21/3469 |

OTHER PUBLICATIONS

E. Arfa Grunditz and T. Thiringer, "Characterizing BEV Powertrain Energy Consumption, Efficiency, and Range During Official and Drive Cycles From Gothenburg, Sweden," in IEEE Transactions on Vehicular Technology, vol. 65, No. 6, pp. 3964-3980, Jun. 2016, doi: 10.1109/TVT.2015.2492239 (Year: 2016).*

K. Kraschl-Hirschmann and M. Fellendorf, "Estimating energy consumption for routing algorithms," 2012 IEEE Intelligent Vehicles Symposium, 2012, pp. 258-263, doi: 10.1109/IVS.2012.6232127 (Year: 2012).*

Preliminary Search Report (5 pages).

Rami Abousleiman et al: "A Bellman-Ford approach to energy efficient routing of electric vehicles", 2015 IEEE Transportation Electrification Conference and Expo (ITEC), Jun. 1, 2015 (Jun. 1, 2015), pp. 1-4.

* cited by examiner

METHOD OF DETERMINING A ROUTE MINIMIZING THE ENERGY CONSUMPTION OF A VEHICLE USING A LINE GRAPH

BACKGROUND OF THE INVENTION

Field of the Invention

The present invention relates to the field of vehicle navigation and in particular to the field of eco-routing, which determines a route minimizing the energy consumption of a vehicle for a given route.

Description of the Prior Art

According to the International Energy Agency, more than 50% of the petroleum consumed worldwide is used by the transport sector, more than three quarters of which is for road transport. Again, according to this agency, the transport sector is responsible for around a quarter (23.8%) of greenhouse gas emissions and for more than a quarter (27.9%) of $CO_2$ emissions in Europe in 2006.

It is therefore more important than ever to increase the energy efficiency of road travels in order to reduce the consumption of energy, whether fossil or electrical energy. Thus, Advanced Driver Assistance Systems (ADAS) represent a promising solution, both economical (the driver's smartphone can simply be used) and non-intrusive (the mechanical components of the vehicle require no modifications).

Among the driver assistance systems intended to improve the energy efficiency of driving techniques, there are mainly two strategies than can and should be complementary: eco-driving and eco-routing. Eco-driving optimizes, in terms of energy consumption, a speed profile along a route. This speed profile is then suggested to the driver, who can reduce the consumption during the ride by following the recommended route. An example of a method concerning eco-driving is described in patent application FR-2,994,923 corresponding to U.S. Pat. No. 9,286,737. Eco-routing identifies the optimum route to go from a start point to an end point by minimizing the energy consumption, and by accounting for a multiplicity of parameters such as the characteristics of the vehicle, the topological characteristics of the road network, the traffic conditions, etc.

Eco-routing is considered in the following US published patent applications: US-2012/123,657, US-2012/179,315, US-2012/066,232, and U.S. Pat. No. 9,091,560. However, these patent applications and patent do not specify how the route minimizing the energy consumption is determined or how the speed used for these methods is determined. It is therefore not possible to know the precision obtained by the methods described in these patent applications.

Other eco-routing methods are based on Dijkstra's shortest path algorithm for determining the route minimizing the energy consumption. However, this algorithm does not take negative values of energy consumption into account. Therefore, this algorithm can be used only for combustion engine vehicles, and it cannot be used for electric vehicles for which energy recovery is possible (with regenerative braking for example). These methods are consequently not adaptable to any type of vehicle. Such methods are notably described in the following documents:

Andersen O, Jens C S, Torp K, Yang B (2013), "EcoTour: Reducing the Environmental Footprint of Vehicles Using Eco-Routes", Proc. 2013 IEEE 14th Int. Conf. on Mobile Data Management, Milan, Italy, 3-6 Jun. 2013, Boriboonsomsin K, Barth M J, Zhu W, Vu A (2012), "Eco-Routing Navigation System Based on Multisource Historical and Real-Time Traffic Information", IEEE Trans. on Intelligent Transportation Systems, vol. 13, no. 4, p. 1694-1704, Ben Dhaou I, "Fuel Estimation Model for ECO-Driving and ECO-Routing", Proc. 2011 IEEE Intelligent Vehicles Symposium, Baden-Baden, Germany, 5-9 Jun. 2011, p. 37-42, Ericsson E, Larsson H, Brundell-Freij K (2006), "Optimizing Route Choice for Lowest Fuel Consumption—Potential Effects of a New Driver Support Tool", Transportation Research Part C, vol. 14, p. 369-383.

SUMMARY OF THE INVENTION

In order to overcome these drawbacks, the present invention relates to a method of determining a route minimizing the energy consumption of a vehicle, based on the use of a dynamic model of the vehicle depending on the vehicle speed and acceleration, the construction of a line graph and a shortest path algorithm suited for negative energies. Using such a dynamic model and constructing a line graph allows higher energy consumption precision, notably by taking account of the accelerations. The algorithm suited for negative energies makes the method adaptable to any type of vehicle, including electric vehicles.

The invention thus relates to a method of determining a route minimizing the energy consumption of a vehicle travelling on a road network. For this method, the following steps are carried out:

a) identifying the position and the destination of the vehicle;

b) constructing a dynamic model of the vehicle that relates the energy consumed by the vehicle to the speed and the acceleration of the vehicle;

c) constructing a line graph of the road network between the identified position of the vehicle and the identified destination of the vehicle;

d) determining the energy consumed by the vehicle for each arc of the line graph by use of the dynamic model of the vehicle and of an average speed of the vehicle on the considered arc, and of an acceleration of the vehicle to reach the average speed on the considered arc; and e) determining the route between the identified position of the vehicle and the identified destination of the vehicle by use of a shortest path algorithm minimizing on the line graph the energy consumption, the shortest path algorithm being suited to account for where appropriate, a negative energy consumption on at least one arc of the line graph.

According to an embodiment, the average speed and the acceleration of the vehicle are determined by use of traffic conditions and/or of the topology and/or of the infrastructures of the road network.

According to a variant, the traffic conditions are obtained in real time through communication with online data services.

Alternatively, the traffic conditions are stored in a historical data storage.

According to a feature, the line graph is constructed using the topology of the road network.

According to an implementation option, the topology of the road network is determined using geolocation.

According to an embodiment, the dynamic model of the vehicle depends on intrinsic parameters of the vehicle.

Preferably, the intrinsic parameters of the vehicle are obtained from a database or they are transmitted by a user.

According to an embodiment, the route is displayed on an autonomous device or on the dashboard of the vehicle.

Advantageously, the dynamic model of the vehicle depends on the power request of at least one auxiliary system of the vehicle.

Preferably, the power request of at least one auxiliary system depends on the outside temperature.

According to an embodiment, the shortest path algorithm is a Bellman-Ford algorithm.

According to a variant embodiment, the line graph is constructed by carrying out the following steps:
i) constructing a directed graph (GD) of the road network (RR) with nodes (N) and arcs (A), the nodes (N) of the directed graph (GD) corresponding to the intersections of the road network, and the arcs (A) of the directed graph corresponding to the roads connecting the intersections; and
ii) constructing the line graph (GA) of the road network (RR) with nodes (N) and arcs (A), the nodes (N) of the line graph (GA) corresponding to the arcs (A) of the directed graph (GD) and the arcs (A) of the line graph (GA) corresponding to the adjacency of the arcs (A) of the directed graph (GD).

Moreover, the invention relates to a computer program product downloadable from a communication network and/or recorded on a computer-readable medium which is executed by a processor or server, comprising program code instructions for implementing the method according to one of the above features, when the program is executed on a computer or on a mobile phone.

BRIEF DESCRIPTION OF THE DRAWINGS

Other features and advantages of the method according to the invention will be clear from reading the description hereafter of embodiments given by way of non-limitative examples, with reference to the accompanying figures wherein.

DETAILED DESCRIPTION OF THE INVENTION

Figure 1:
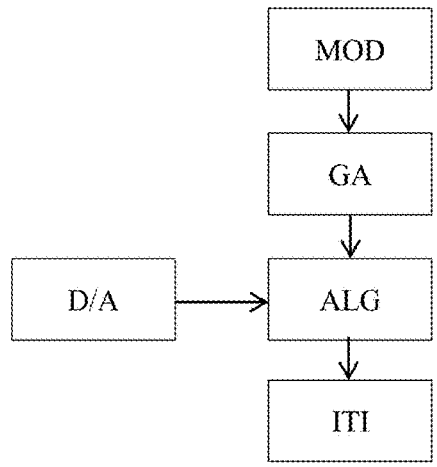
FIG. 1 illustrates the steps of the method according to an embodiment of the invention.

The present invention relates to an eco-routing method, that is a method of determining a route minimizing the energy consumption of a vehicle travelling on a road network. A route is understood to be the path that should be travelled by a vehicle in order to go from a start point (current position of the vehicle) to an end point (destination of the vehicle).

The method according to the invention is suited to any type of vehicle: combustion vehicles, hybrid vehicles, electric vehicles.

NOTATIONS

The following notations are used in the description hereafter:

| | | |
|---|---|---|
| v | Vehicle speed | [m/s] |
| x | Vehicle position | [m] |
| m | Vehicle mass | [kg] |
| ω | Vehicle engine speed | [tr/s] |
| $F_w$ | Vehicle traction force on the wheel | [N] |
| $F_{areo}$ | Aerodynamic force on the vehicle | [N] |
| $F_{friction}$ | Friction force undergone by the vehicle | [N] |
| $F_{slope}$ | Normal force undergone by the vehicle (gravity) | [N] |
| $F_{res}$ | Resultant of aerodynamic and rolling losses | [N] |
| α | Angle of inclination of the road | [rad] |
| $\rho_a$ | Air density | [kg/m$^3$] |
| $A_f$ | Frontal area of the vehicle | [m2] |
| $c_d$ | Aerodynamic drag coefficient | [—] |
| $c_r$ | Rolling resistance coefficient | [—] |
| g | Gravitational acceleration | [m$^2$/s] |
| $a_0, a_1$ and $a_2$ | Vehicle parameters | [—] |
| r | Wheel radius | [m] |
| $\rho_t$ | Vehicle transmission ratio | [—] |
| $\eta_t$ | Vehicle transmission efficiency | [—] |
| $T_m$ | Engine torque | [Nm] |
| $T_{m,max}$ | Maximum engine torque | [Nm] |
| $T_{m,min}$ | Minimum engine torque | [Nm] |
| $P_m$ | Power available at engine shaft | [W] |
| $P_b$ | Power demand at the battery | [W] |
| $\eta_b$ | Aggregate efficiency of the electric traction chain | [—] |
| $P_{aux}$ | Power of the vehicle auxiliaries | [W] |
| $T_{amb}$ | Ambient temperature | [K] |
| i | Road segment i | [—] |
| i-1 | Road segment preceding road segment i | [—] |
| $\bar{v}$ | Average traffic speed | [m/s] |
| K | Function | |
| $E_i$ | Energy consumption over segment i | [Wh] |

| | | |
|---|---|---|
| $E_b$ | Energy consumption at the battery | [Wh] |
| $\overline{P}_i$ | Power of the vehicle on segment i at average speed | [W] |
| $\dot{P}_i$ | Power of the vehicle on segment i at variable speed | [W] |
| $T_i$ | Travel time on segment i | [s] |
| $l_i$ | Length of segment i | [m] |
| $E_{jump,i}$ | Energy consumption associated with speed fluctuation for segment i | [Wh] |
| $t_{jump,i}$ | Time required for speed fluctuation for segment i | [s] |
| $W_k^*$ | Line graph arc weight | [Wh] |

For these notations, the time derivative is denoted by $$\frac{d}{dt}$$

or by a point above the variable considered.

The method according to the invention comprises the following steps:
1) vehicle position and destination identification
2) vehicle dynamic model construction
3) line graph construction
4) energy consumption determination on the line graph
5) route determination.

The dynamic model construction and line graph construction steps can be carried out in this order, simultaneously or in the reverse order.

FIG. 1 illustrates by way of non-limitative example the steps of the method according to an embodiment of the invention.

1) vehicle position and destination identification (D/A)
2) vehicle dynamic model construction (MOD)
3) line graph construction (GA)
4) energy consumption determination on the line graph, using the dynamic model (MOD) and the line graph (GA)
5) eco-route (ITI) determination by use of a shortest path algorithm (ALG) applied to the line graph (GA) weighted by the energy consumption.

Figure 2:
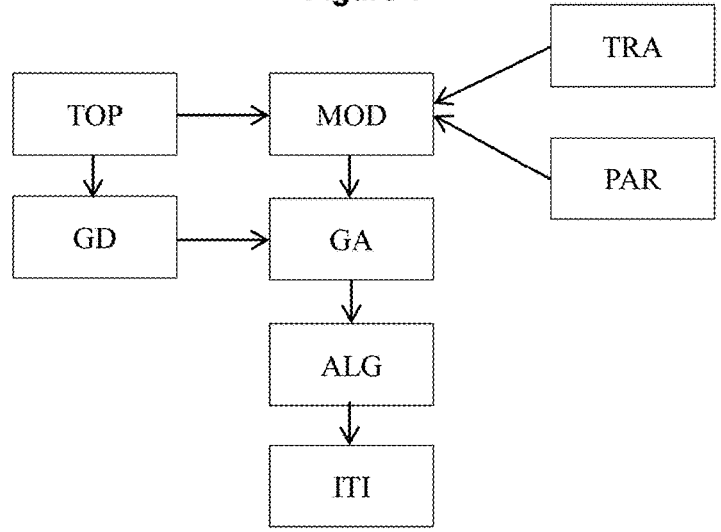
FIG. 2 illustrates the steps of the method according to a second embodiment of the invention.

FIG. 2 illustrates by way of non-limitative example the steps of the method according to a second embodiment of the invention. In addition to the steps described in connection with FIG. 1, the method comprises the following optional steps:
 determining the road network topology (TOP). The road network topology can be used for construction of the dynamic model (MOD) and for construction of the line graph (GA);
 determining the road traffic (TRA). Traffic determination can be used for construction of the dynamic model (MOD) and for construction of the line graph (GA);
 determining the intrinsic parameters of the vehicle (PAR), these parameters can be used for construction of the dynamic model (MOD); and
 constructing a directed graph (GD) of the road network. The directed graph can be obtained using the road network topology (TOP) and it can be used for construction of the line graph (GA).

The steps of determining the road network topology (TOP), the road traffic (TRA) and the intrinsic parameters of the vehicle (PAR) are independent. It is therefore possible to carry out only part of these steps.

All the steps of the method, including their variants shown in FIG. 2, are described below.

1) Vehicle Position and Destination Identification

In this step, the current position and the destination of the vehicle are identified. In other words, the starting point and the end point of the route to be travelled are identified.

The current position of the vehicle can be identified using a geolocation system (of GPS or Galileo type for example). Alternatively, the current position can be given by a user using an interface therewith (a smartphone, the dashboard or a geolocation system for example).

The destination of the vehicle can be given by a user using an interface therewith. Alternatively, the destination can be stored in a database, for example if it is a previously known destination (a smartphone, the dashboard or a geolocation system for example).

2) Vehicle Dynamic Model Construction

In this step, a dynamic model of the vehicle is constructed. Dynamic model of the vehicle is a model connecting the energy consumption of the vehicle to the speed and acceleration of the vehicle. The dynamic model of the vehicle can be constructed using the fundamental principle of dynamics, associated with an engine energy model.

According to an embodiment of the invention (see the step of determining the intrinsic parameters of the vehicle of FIG. 2), the model can be constructed from macroscopic parameters of the vehicle, for example: vehicle engine power, vehicle mass, maximum power, maximum speed, transmission type, aerodynamic parameters, etc. Thus, the dynamic model is representative of the vehicle and it takes into account its specific characteristics.

According to a variant embodiment, the macroscopic parameters can be obtained from a database that lists the various vehicles in service. For example, the macroscopic parameters can be obtained by entering the registration number of the vehicle, the database associating the plate number with the design thereof (make, model, engine power, etc.) and comprising the macroscopic parameters of the vehicle. Alternatively, the macroscopic parameters can be manufacturer data provided by the user, in particular using an interface (a smartphone, the dashboard or a geolocation system for example).

The dynamic model of the vehicle can also depend on road parameters such as the slope of the road. Such data can be obtained from a topology (see the topology determination step of FIG. 2) or a map of the road network.

The dynamic model of the vehicle takes into account the dynamics of the vehicle. It can be constructed from the application of the fundamental principle of the vehicle dynamics applied to the longitudinal axis thereof, and it can be written as follows:

$$m\frac{dv(t)}{dt} = F_w - F_{aero} - F_{friction} - F_{slope}$$

where m is the mass of the vehicle, v(t) is the speed thereof, $F_w$ is the force on the wheel, $F_{aero}$ is the aerodynamic force, $F_{friction}$ is the rolling resistance force and $F_{slope}$ is the gravitational force. The model can thus be rewritten as follows:

$$\begin{cases} \dot{x}(t) = v(t) \\ m\dot{v}(t) = F_w - \frac{1}{2}\rho_a A_f c_d v(t)^2 - mgc_r - mg\sin(\alpha(x)) \end{cases}$$

where $\rho_a$ is the air density, $A_f$ is the frontal area of the vehicle, $c_d$ is the aerodynamic drag coefficient, $c_r$ is the rolling resistance coefficient, $\alpha(x)$ is the slope of the road as a function of the position and g is the gravitational acceleration. The sum of the aerodynamic and rolling losses is generally approximated with a second-order polynomial as a function of speed v:

$$F_{res} = F_{aero} + F_{friction} = a_2 v(t)^2 + a_1 v(t) + a_0$$

where parameters $a_0$, $a_1$ and $a_2$ can be identified for the vehicle considered from a standard test referred to as coast down test.

Therefore, the force on the wheel can be expressed as follows:

$$F_w = m\dot{v}(t) + a_2 v(t)^2 + a_1 v(t) + a_0 + mg\sin(\alpha(x))$$

Hereafter, the dynamic model of the vehicle is described for a non-limitative embodiment of an electric vehicle. The electric vehicle comprises at least one electric machine, at least one electric energy storage (such as a battery) for powering the electric motor or for being powered by the electric machine (in case of regenerative braking), and are energy recovery, notably regenerative braking. However, the model is adaptable to any type of engine (thermal, hybrid, electric).

The torque requested from the electric machine to achieve the requested force on the wheel is defined as follows:

$$T_m = \begin{cases} \dfrac{F_w r}{\rho_t \eta_t}, & \text{if } F_w \geq 0 \\ \dfrac{F_w r \eta_t}{\rho_t}, & \text{if } F_w < 0 \end{cases}$$

where r is the radius of the wheel, $\rho_t$ and $\eta_t$ are the transmission ratio and the transmission efficiency. An electric machine is generally a reversible machine, therefore it behaves like a motor when $T_m$ is positive and like a generator (energy recovery) when $T_m$ is negative. The torque generated by the electric machine is saturated by $T_{m,max}$ and $T_{m,min}$. In particular, during braking phases, if the engine torque is less negative than saturation value $T_{m,min}$, then the vehicle is slowed down only by the regenerative braking system. Otherwise, the mechanical brake comes into operation, thus adding its action to the regenerative braking.

The power available at the engine shaft, in the presence of a regenerative braking system, can be defined as follows:

$$P_m = \begin{cases} T_{m,max}\omega(t), & \text{if } T_m \geq T_{m,max} \\ T_m \omega(t), & \text{if } T_{m,min} < T_m < T_{m,max} \\ T_{m,min}\omega(t), & \text{if } T_m \leq T_{m,min} \end{cases}$$

where $\omega_t$ is the engine speed defined as:

$$\omega(t) = \frac{v(t)\rho_t}{r}$$

The power demand at the battery is expressed as follows:

$$P_b = \begin{cases} \dfrac{P_m}{\eta_b}, & \text{if } P_m \geq 0 \\ P_m \eta_b, & \text{if } P_m < 0 \end{cases}$$

where $\eta_b$ is the aggregate efficiency of the electric traction chain (inverter, battery, etc.).

According to an embodiment of the invention, the precision of the model and of the estimation of the energy consumption of a path can be improved by taking into account the power demand of at least one auxiliary system in the dynamic model of the vehicle. Indeed, the power requested by the driver for comfort purposes, notably for passenger compartment heating or air conditioning, is particularly costly in terms of energy consumption, notably for an electric vehicle where heating can have a very strong impact on the range. The term relative to the power requested by the auxiliaries can be expressed as a function of the ambient temperature:

$$P_{aux} = K(T_{amb})$$

Thus, for this embodiment, the energy consumption at the battery over a time horizon T can be defined as:

$$E_b = \int_0^T P_b + P_{aux} dt$$

The model described above requires an instantaneous speed signal. This information is not available a priori on the road segments (road portions of the road network) for which the only information available are average speeds.

According to the invention, an average speed is first considered for each road segment, then the vehicle acceleration to reach this average speed from the previous segment is considered. Preferably, the average speed can be obtained from information on the road traffic on the road network.

According to a variant, the average speed on a segment can be obtained in real time through communication with online data services that acquire real time information on the traffic on the road network. This optional traffic determination step is described for the embodiment of FIG. 2.

Alternatively, the average speed can be stored by historical data storage means that store traffic data relative to the road network, notably for different days, different times, etc.

Thus, if the average speed $\bar{v}$ due to the traffic on a road segment is assumed to be known, the model described above can be modified in order to assess the energy consumption of the vehicle for travelling the road segment considered. Speed v(t) is subsequently replaced by the average traffic speed $\bar{v}$ in the dynamic model. It is thus assumed that all the vehicles on road segment i run at speed $\bar{v}_i$. The expression of the force on the wheel is therefore modified for each road segment i:

$$\bar{F}_{w,i} = a_2 \bar{v}_i^2 + a_1 \bar{v}_i + a_0 + mg\sin(\alpha_i(x))$$

where the acceleration term disappears. The engine torque becomes:

$$T_{m,i} = \begin{cases} \dfrac{\overline{F}_{w,i} r}{\rho_t \eta_t}, & \text{if } \overline{F}_{w,i} \geq 0 \\ \dfrac{\overline{F}_{w,i} r \eta_t}{\rho_t}, & \text{if } \overline{F}_{w,i} < 0 \end{cases}$$

The engine speed is also constant over time since a constant speed $\overline{v}_i$ is assumed:

$$\overline{\omega}_i = \frac{\overline{v}_i \rho_t}{r}$$

The mechanical power available at the electric machine is rewritten as follows:

$$\overline{P}_{m,i} = \begin{cases} T_{m,max} \cdot \overline{\omega}_i, & \text{if } \overline{T}_{m,i} \geq T_{m,max} \\ \overline{T}_{m,i} \cdot \overline{\omega}_i, & \text{if } T_{m,min} < \overline{T}_{m,i} < T_{m,max} \\ T_{m,min} \cdot \overline{\omega}_i, & \text{if } \overline{T}_{m,i} \leq T_{m,min} \end{cases}$$

It is assumed hereafter that the torque saturation values are independent of the engine speed. However, other embodiments are valid, notably the maximum and minimum torques can depend on the engine speed.

The power request from the battery of the electric vehicle can be defined as follows:

$$\overline{P}_{b,i} = \begin{cases} \dfrac{\overline{P}_{m,i}}{\eta_b}, & \text{if } \overline{P}_{m,i} \geq 0 \\ \overline{P}_{m,i} \eta_b, & \text{if } \overline{P}_{m,i} < 0 \end{cases}$$

The energy consumption of the battery thus is:

$$\overline{E}_{b,i} = (\overline{P}_{b,i} + P_{aux}) T_i$$

where $T_i = l_i / \overline{v}_i$ is the travel time on road segment i if the vehicle runs at the average traffic speed $\overline{v}_i$.

Using the average speed in energy consumption models is a standard approach in the prior art. The method according to the invention proposes to take into account the acceleration in the dynamic model of the vehicle for a more precise and reliable assessment of the true consumption. To take acceleration phenomena into account, the travel over each road segment is divided into two phases: a phase of constant cruising speed $\overline{v}_i$ and a speed fluctuation (i.e. acceleration or deceleration) phase for switching from speed $\overline{v}_{i-1}$, that is the average speed of the previous segment, to speed $\overline{v}_i$, i.e. the average speed of the current segment. Preferably, a constant acceleration (or deceleration) is considered to reach speed $\overline{v}_i$. Therefore, even if the available macroscopic information does not allow knowledge of the temporal information, the spatial acceleration occurring at the interface between two road segments is considered. The energy consumption $E_{jump,i}$ associated with the speed fluctuation between two road segments is defined as follows:

$$E_{jump,i} = \int_0^{t_{jump,i}} (\tilde{P}_{b,i} + P_{aux}) dt$$

with $\tilde{P}_{b,i}$ being the power demand at the battery for the acceleration phase to shift from speed $\overline{v}_{i-1}$ to speed $\overline{v}_i$.

Such a power demand at the battery can be obtained, as previously stated, from a force on the interface wheel defined as:

$$\tilde{F}_w = m \cdot a + a_2 v(t)^2 + a_1 v(t) + a_0$$

where the time-varying speed v(t) in each transient can here be linearly modelled as follows:

$$v(t) = \overline{v}_{i-1} + \text{sign}(\overline{v}_i - \overline{v}_{i-1}) \cdot a \cdot t$$

where $\overline{v}_{i-1}$ is the speed on the upstream segment, $\overline{v}_i$ is the speed on the downstream segment and a is the constant acceleration for achieving the speed change. The speed fluctuation is thus achieved as follows:

$$t_{jump,i} = \frac{\overline{v}_i - \overline{v}_{i-1}}{\text{sign}(\overline{v}_i - \overline{v}_{i-1}) \cdot a}$$

The total energy consumption on segment i is thus defined:

$$E_{b,i} = \overline{E}_{b,i} + E_{jump,i}$$

Taking the interface accelerations into account makes the model more precise. However, the a priori available information is not always complete or updated. Notably, it is not probable to have precise information on the average traffic speeds for secondary roads. It is therefore possible to have long road portions for which the traffic speed is simply a constant nominal value. In this case, taking into account only the data relative to the road network would assume that there is no acceleration, which would generate big energy consumption assessment errors. That is why the invention also allows to enrich the road network-related data by integrating the speed perturbations induced by critical elements of the road infrastructure, notably traffic lights, intersections and bends. For example, if a traffic light is known to be located at the interface between two segments, its impact is taken into account in the consumption assessment, by taking into account the speed fluctuation between the two segments.

Taking into account these accelerations not only allows to obtain more realistic and precise energy costs, but also avoids negative loops in the routing graph modelling the road network. Indeed, the negative loop represents a sequence of road segments having the same start and end point with a negative total cost. In the specific case of a weighted graph with energy weights, this represents a situation of infinite energy recovery when travelling the loop continuously, which is in actual fact impossible. This criticality is easily verified when considering electric vehicles and if the consumption assessment for a road segment and neighboring segments does not take into account important elements such as the slope and/or the accelerations for transiting from one segment to another. The presence of negative loops in the routing graph prevents finding a route that globally minimizes the consumption because the search algorithm would converge trivially on these loops to reduce the consumption.

According to an embodiment of the invention, the speed fluctuation between the two segments can be modelled as two transients: the first one for changing from speed $\overline{v}_{i-1}$ to 0 (for stopping at a traffic light for example) and the second one for changing from speed 0 to speed $\overline{v}_i$. Thus, the energy consumption related to the speed fluctuation can be described as the sum of two contributions:

$$E_{jump,i} = \int_0^{t_{jump1,i}} (\tilde{P}_{b1,i} + P_{aux})dt + \int_0^{t_{jump2,i}} (\tilde{P}_{b2,i} + P_{aux})dt$$

where the speed fluctuation in the first term is modelled as follows:

$$v_1(t) = \bar{v}_{i-1} - a \cdot t$$

and the time required for the first fluctuation:

$$t_{jump1,i} = \bar{v}_{i-1}/a$$

Similarly, the speed fluctuation in the second term is modelled as follows:

$$v_2(t) = a \cdot t$$

and the time required for this fluctuation:

$$t_{jump2,i} = \bar{v}_i/a$$

Therefore, according to the invention, the dynamic model of the vehicle can be written (for any type of vehicle):

$$E_i = \bar{P}_i T_i + \int_0^{t_{jump,i}} \tilde{P}_i \, dt$$

with $E_i$ being the energy consumption on segment i, $\bar{P}_i$ being the power requested from the energy storage system of the vehicle (fuel tank, battery, etc.) when the vehicle is considered to be at constant speed on segment i, $T_i$ being the time during which the vehicle is considered to be at constant speed on segment i, $\tilde{P}_i$ being the power requested from the energy storage system of the vehicle when the vehicle is considered to have a speed fluctuation (speed fluctuation between segment i−1 and segment i), and $t_{jump,i}$ being the time required for achieving the speed fluctuation. The first term of the model corresponds to the energy consumption on the segment due to the average speed and the second term corresponds to the energy consumption due to the speed fluctuation for reaching the average speed.

For the embodiment taking into account the power demand of at least one auxiliary system, the dynamic model of the vehicle can be written as follows (for any type of vehicle):

$$E_i = (\bar{P}_i + P_{aux})T_i + \int_0^{t_{jump,i}} (\tilde{P}_i + P_{aux})dt$$

with $E_i$ being the energy consumption on segment i, $\bar{P}_i$ being the power requested from the energy storage system of the vehicle (fuel tank, battery, etc.) when the vehicle is considered to be at constant speed on segment i, $P_{aux}$ being the power demand of at least one auxiliary system, $T_i$ being the time during which the vehicle is considered to be at constant speed on segment i, $\tilde{P}_i$ being the power requested from the energy storage system of the vehicle when the vehicle is considered to have a speed fluctuation (speed fluctuation between segment i−1 and segment i), and $t_{jump,i}$ being the time required for achieving the speed fluctuation. The first term of the model corresponds to the energy consumption on the segment due to the average speed and the second term corresponds to the energy consumption due to the speed fluctuation for reaching the average speed.

It is noted that, for an electric vehicle, the energy consumption can be negative. Indeed, braking may allow energy to be recovered in the battery.

3) Line Graph Construction

In this step, a line graph of the road network is constructed. In graph theory, a line graph of a graph G (the road network in the present case) is understood to be a graph representing the adjacency relation between the edges of G. The line graph of a graph can be defined as follows: each vertex of the line graph represents an edge (also called arc) of graph G and two vertices of the line graph are adjacent (i.e. connected) if and only if the corresponding edges share a common end in graph G. Thus, the line graph is an equivalent representation of the road network where all the maneuvers are correctly decoupled and distinguished, which enables precise determination of the energy costs.

For the methods according to the prior art, the road network can be modelled as a directed graph. Let graph G=(V,A), where V is the set of all nodes and A is the set of all connections between the nodes, that is the arcs. Let w:A→W be a function assigning a weight to each arc of the graph. In the graphs used for conventional routing, the weight associated with the arcs represents either the length or the travel time. For eco-routing, each weight represents the energy consumption for travelling through the arc.

According to an embodiment of the invention, the objective of this work can be to design a strategy based solely on statistical and topological information on the road network, without using any real driving data. This type of information, often incomplete and/or imprecise, is generally available on commercial web map services (online services). For each arc i∈A of the graph, it is possible to know the length, the average speed of the current traffic $v_i$ that depends on the time of the day, and the slope of $\alpha_i(x)$ that varies within the arc considered as a function of the position. Furthermore, some web map services provide a degree of importance for each road segment, specifying whether it is a highway, a major urban road or a secondary urban street. Besides, the position of some traffic lights can be available.

By use of the method according to the invention, it is possible to considerably improve the precision of assessment of the energy consumption and of the routing navigation, considering the accelerations induced by the various speeds in the road segments and/or by the known infrastructure elements.

Taking into account the interface accelerations between adjacent arcs poses a problem for modelling the road network as a directed graph (prior art) and particularly for assigning weights to each arc. In particular, each node of the graph with two or more incoming arcs is critical because $v_{i-1}$ and therefore $E_{jump,i}$ are not unique. Of course, this prevents an unambiguous assignment of weights to the arcs. Therefore, directed graph G is not adequate for the proposed energy consumption model. This ambiguity can be solved using the line graph as the graph for the proposed routing strategy.

According to an embodiment of the invention, the line graph of the road network is constructed by carrying out the following steps:

i) constructing a directed graph of the road network with nodes and arcs (also referred to as segments or edges), the nodes of the directed graph corresponding to the intersections of the road network, and the arcs of the directed graph corresponding to the roads connecting the intersections; and ii) constructing the line graph of the road network with nodes and arcs, the nodes of the line graph corresponding to the arcs of the directed graph and the arcs of the line graph corresponding to the adjacency of the arcs of the directed graph.

Figure 3:
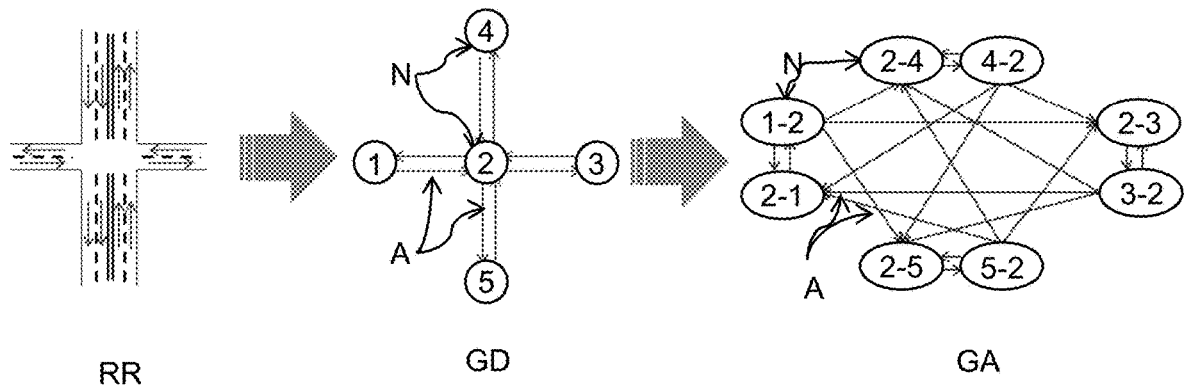
FIG. 3 illustrates the construction of a line graph according to an embodiment of the invention.

FIG. 3 illustrates by way of non-limitative example these line graph construction steps. Road network RR concerns an intersection between two roads. The first step consists in constructing directed graph GD from the road network. Directed graph GD comprises five nodes N corresponding to the four ends of the roads and to the intersection thereof. Furthermore, directed graph GD comprises eight arcs A connecting the nodes and corresponding to the roads of road network RR. The second step consists in constructing line graph GA from directed graph GD. Line graph GA comprises eight nodes N corresponding to each arc of directed graph GD. Furthermore, line graph GA comprises twenty arcs A corresponding to the adjacency of nodes N of directed graph GD.

4) Determination of the Energy Consumption for Each Arc of the Line Graph

In this step, a weight is determined for each arc of the line graph. The weight corresponds to the energy used by the vehicle on this arc. The dynamic model of the vehicle is therefore applied for each arc of the line graph, by considering the average speed of the vehicle on this arc, and the acceleration of the vehicle for reaching the average speed. It is thus possible to know with precision the energy consumption on an arc, which allows determination of an optimal route in terms of energy expenditure.

Using line graph L(G) as the routing graph allows assigning in a unique way the weight to each arc of the graph, by decoupling all the possible maneuvers modelled in the original graph G. Each arc of the line graph represents a path over two adjacent arcs of directed graph G, and therefore each arc of line graph L(G) contains information on an arc of the original directed graph G and on its upstream arc.

This intrinsic property of the line graph not only allows correct consideration of the interface accelerations between adjacent arcs, it also allows modelling in a more realistic manner the impact of the infrastructure on the energy consumption. More specifically, according to a proposed modelling approach, the energy term that takes account of the stops/restarts induced by the infrastructure:

$$E_{jump,i} = \int_0^{t_{jump1,i}} (\tilde{P}_{b1,i} + P_{aux})dt + \int_0^{t_{jump2,i}} (\tilde{P}_{b2,i} + P_{aux})dt$$

This consideration can be introduced only on the arcs of the line graph that represent the following situations:
- a traffic light or a stop sign at the junction between an upstream lower priority road and a downstream higher priority road. The green waves on the major roads are therefore not penalized;
- the upstream and downstream arcs are connected by a maneuver with a turning angle wider than an adjustable threshold.

The line graph $L(G)=(V^*,A^*)$ of a graph G has the arcs of graph G as its nodes, therefore $i \in A$ but also $i \in V^*$. Therefore, let $w^*:A^* \to W^*$ be a new function of weight assignment to the arcs of the line graph. The weight for each arc $k \in A^*$ is defined as follows:

$$W_k^* = \begin{cases} \overline{E}_{b,i} + E_{jump,i}, & \text{if } i-1 \in V^* \text{ has incoming arcs} \\ \overline{E}_{b,i} + E_{jump,i} + \overline{E}_{b,i-1}, & \text{if } i-1 \in V^* \text{ has no incoming arcs} \end{cases}$$

It is understood that, for an electric vehicle, the energy on an arc can be negative. Therefore, the weight of this arc of the line graph can be negative. Indeed, braking can allow energy to be recovered in the battery.

5) Route Determination

In this step, the route minimizing the energy consumption of the vehicle between the identified position and the identified destination is determined. This step is carried out by taking into account the energy consumption on each arc of the line graph. Determination of the eco-route is performed by a shortest path algorithm. The shortest path algorithm determines the route on the line graph by taking into account the energy consumption determined for each arc. The optimum algorithm that computes the shortest path in a directed and weighted graph from a source vertex is the Bellman-Ford algorithm. The selected algorithm is suited for accounting for a negative weight (that is energy consumed) on at least one arc of the line graph, unlike others such as Dijkstra's algorithm which, although faster, is not optimal in the presence of arcs with negative weights.

Once the algorithm reproduces the optimum sequence of nodes of the line graph, this result can be readily transferred to the original graph by generating the sequence of nodes of the original graph between origin and destination corresponding to the optimum path, that is the optimum route in terms of energy expenditure.

According to an embodiment of the invention, the approach can comprise a stage of offline recording of the global historical information on the traffic conditions of different days of a week selected at different times of the day. Real-time adaptation is implemented only after the driver selects the starting point, the destination and the departure time. The N best eco-routes are computed from the historical data. Their total cost is subsequently updated according to the current traffic conditions and compared to determine the best current route in terms of energy consumption. This solution allows the traffic conditions to be taken into account in real time.

Indeed, traffic conditions vary a lot throughout the day and, to reach an optimum global eco-routing solution, the energy cost of all the arcs of the graph should be updated according to the desired departure time. The size of the graph can be large and the computational time for updating all the weights is not suited for real-time use.

Besides, according to an embodiment of the invention, the computed route can be compared with other routes obtained using various performance indices, notably the travel time. Thus, the user can choose, as needed, the most interesting compromise between energy consumption and travel time.

An optional step of the method according to the invention can display the route determined, for example on the screen of a geolocation system (GPS, Galileo), of a smartphone, on the dashboard of the vehicle, on a website, etc. Thus, it is possible to inform the user or any other person (for example a vehicle fleet manager, a road infrastructure manager, etc.) of the eco-route. It is also possible to display the energy consumption for the route, which is assessed by use of the model and of the line graph.

The method according to the invention can be used for motor vehicles. It can however be used in the field of road transport, two-wheelers, etc.

Furthermore, the invention relates to a computer program product which is at least one of downloadable from a communication network, recorded on a computer-readable medium and executed by processor or server. This program comprises program code instructions for implementing the method as described above, when the program is executed on a computer or on a mobile phone.

Examples

The two examples presented below show the good consistency of the dynamic model according to the invention with measured values. The dynamic model used for these two examples is the model exemplified in the application (step 2).

The examples were carried out with an electric vehicle having the characteristics shown in Table 1.

TABLE 1

Characteristics of the vehicle

| Characteristics | Symbol | Value |
| --- | --- | --- |
| Mass of the vehicle | m | 1190 kg |
| Wheel radius | r | 0.2848 m |
| Transmission ratio | $\rho_t$ | 5.763 |
| Transmission efficiency | $\eta_t$ | 0.95 |
| Acceleration | a | 1.5 m/s$^2$ |
| Coefficient | $a_0$ | 125.73N |
| Coefficient | $a_1$ | 1.72N/(m/s) |
| Coefficient | $a_2$ | 0.58N/(m/s)$^2$ |
| Minimum engine torque | $T_{m,min}$ | −50 Nm |
| Maximum engine torque | $T_{m,max}$ | 200 Nm |
| Electric motor efficiency | $\eta_b$ | 0.85 |

The experimental results for these examples were obtained with open road tests by recording the position and the speed using a GPS sensor. The tests were carried out in town, on various road types to check for the robustness and the precision of the consumption prediction by the dynamic model of the method according to the invention. The same route was used repeatedly, always at the same departure time, for several days. The energy consumption subsequently used as the reference was computed using the dynamic model described above from the real instantaneous speed profile recorded. The energy consumption was assessed by the macroscopic model which is the object of the invention from average traffic speeds obtained by the web (traffic) map services.

Two validation results are presented here. These results illustrate the improvement of the energy consumption assessment in relation to the standard technique used in the prior art.

First Case Study

The first validation study was carried out on a route with a combination of urban roads and highway.

Figure 4:
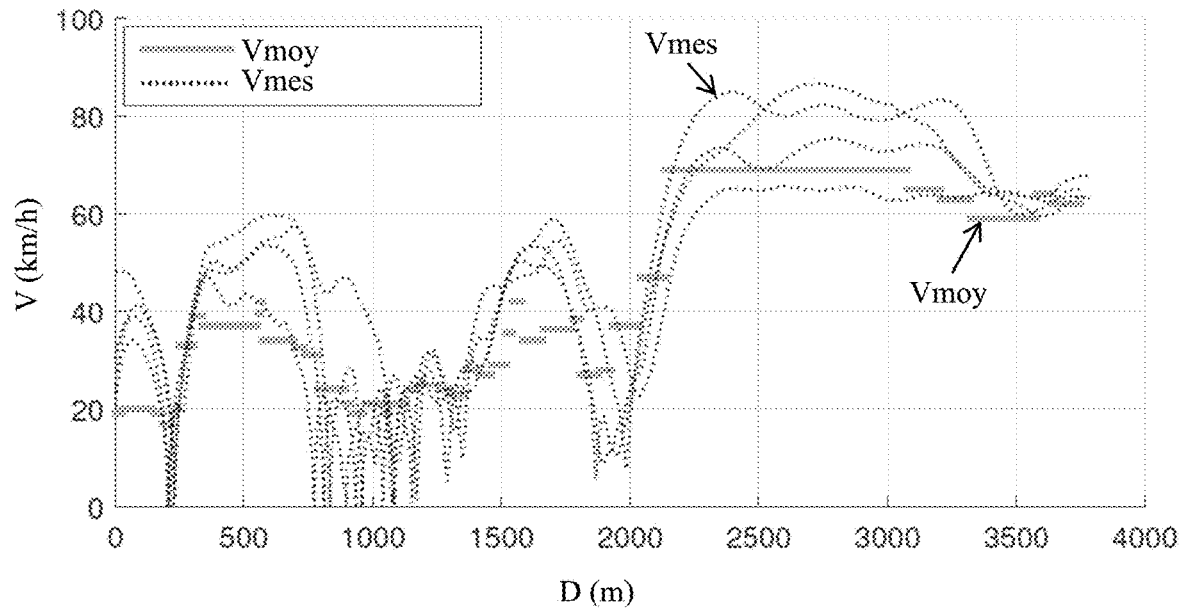
FIG. 4 illustrates the average speed and the measured speeds over a first path.

FIG. 4 illustrates, for this first case study, the various speeds Vmes (km/h) measured as a function of the travelled distance D (m) on this path. FIG. 4 also illustrates the average speed Vmoy on each route segment. Average speed Vmoy is obtained as a function of the traffic conditions by communication with online services. The real speed profiles Vmes show good repeatability characteristics even though they correspond to different days. The average speed Vmoy macroscopic data is fairly representative of the traffic conditions at the time of the tests.

Figure 5:
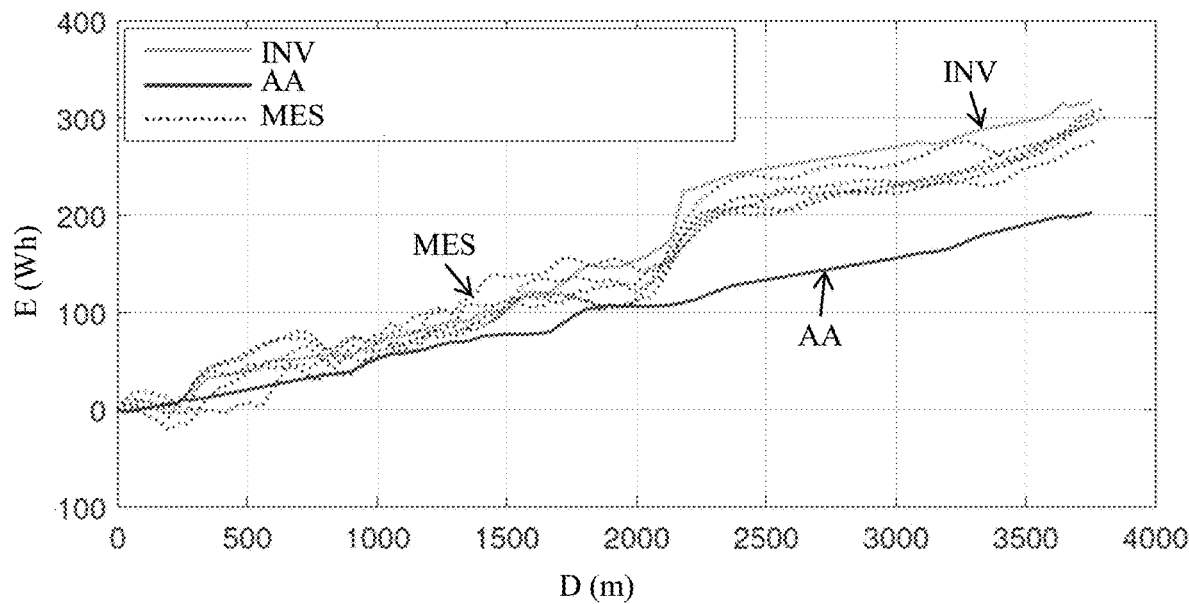
FIG. 5 illustrates the cumulative measured energy consumption, the cumulative energy consumption determined by a model according to the prior art and the cumulative energy consumption determined by a dynamic model according to the invention, for the example of FIG. 4.

FIG. 5 illustrates, for this first case study, the cumulative energy consumption E (Wh) over the distance D (m) travelled on this route. This graph shows the cumulative energy consumption for the measured values MES (obtained with the measured speeds), where the cumulative energy consumption assessed with the average speed with a model according to the prior art AA does not take acceleration into account, and the cumulative energy consumption assessed with the model according to the invention INV that takes acceleration into account. The model based on the average speeds AA that does not take accelerations into account leads to significant errors by underestimating the true consumption. The error of this type of model in relation to the average of the reference final energy values in this first case study is approximately 30%. The dynamic model proposed in the invention INV, which also takes account of accelerations, can follow more precisely the consumption variation trends. The energy consumption assessment error in relation to the reference is approximately 7%.

Second Case Study

The second validation study was carried out on a route with only secondary urban roads.

Figure 6:
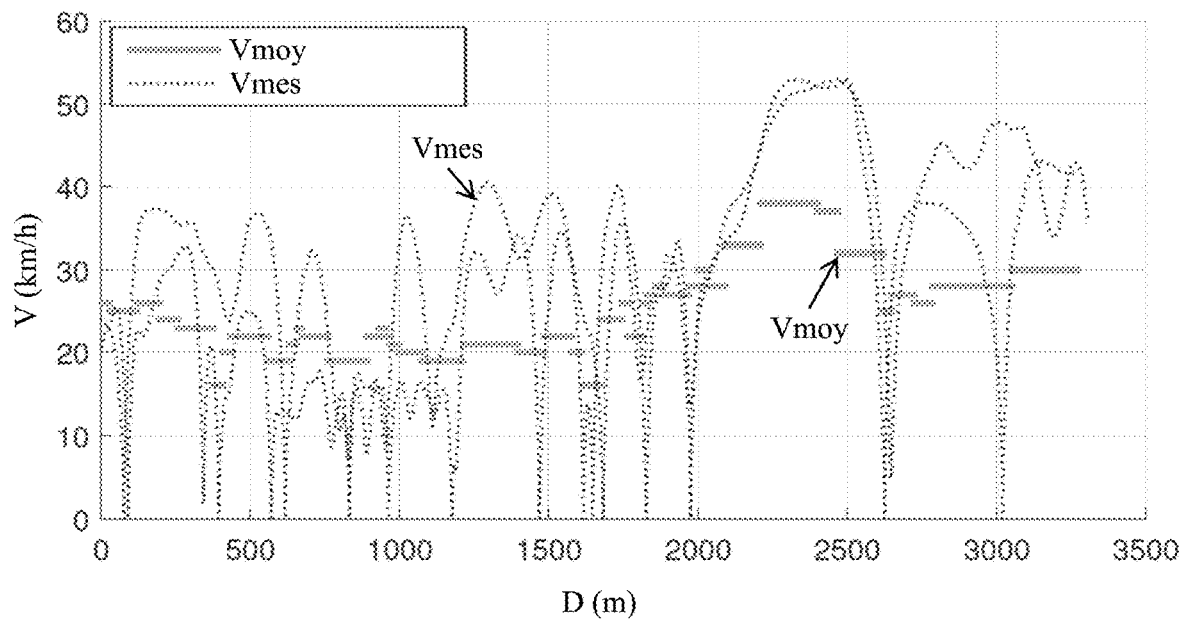
FIG. 6 illustrates the average speed and the measured speeds for a second path.

FIG. 6 illustrates, for this second case study, the various speeds measured Vmes (km/h) as a function of the travelled distance D (m) on this path. FIG. 6 also illustrates the average speed Vmoy on each route segment. Average speed Vmoy is obtained as a function of the traffic conditions by communication with online services. The real speed profiles Vmes show good repeatability characteristics even though they correspond to different days. The average speed Vmoy macroscopic data is fairly representative of the traffic conditions at the time of the tests.

Figure 7:
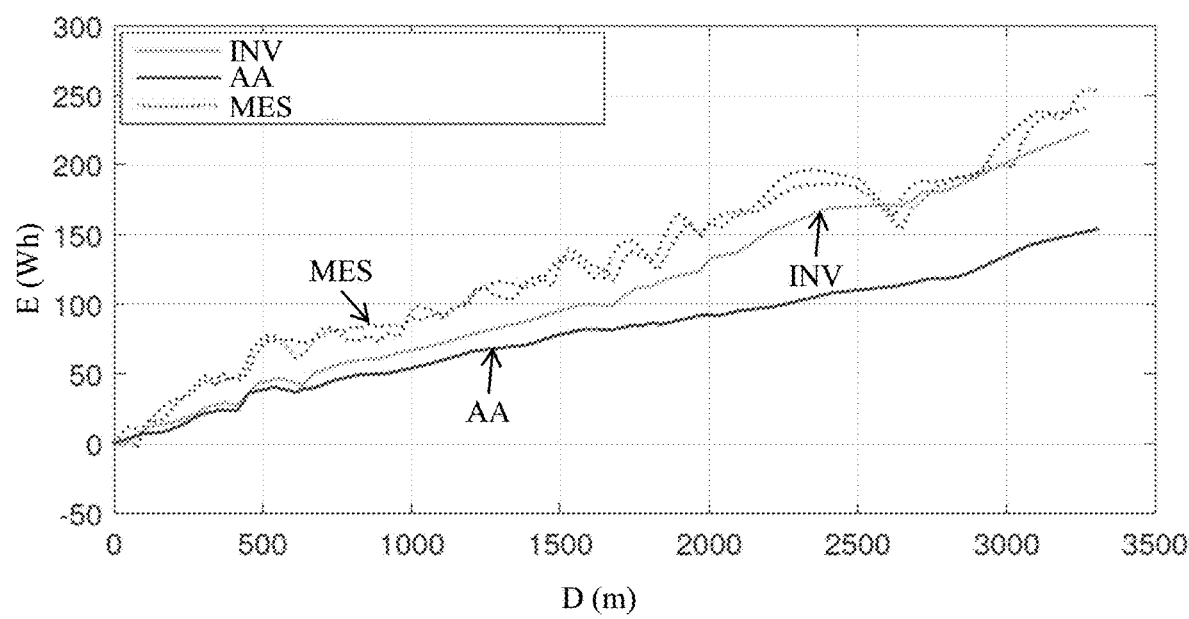
FIG. 7 illustrates the cumulative measured energy consumption, the cumulative energy consumption determined by a model according to the prior art and the cumulative energy consumption determined by a dynamic model according to the invention, for example in FIG. 6.

FIG. 7 illustrates, for this second case study, the cumulative energy consumption E (Wh) over the distance D (m) travelled on this route. This graph shows the cumulative energy consumption for the measured values MES (obtained with the measured speeds), where the cumulative energy consumption assessed with the average speed with a model according to the prior art AA does not take account of acceleration, and the cumulative energy consumption assessed with the model according to the invention INV that takes acceleration into account. In this second case study, the models based on the average speeds AA according to the prior art that do not take accelerations into account lead to yet more significant errors by underestimating the true consumption. The error in relation to the reference is approximately 38%. This behavior is due to the fact that, on secondary urban roads, the precision and the reliability of the macroscopic average speed data are much lower. Thus, the average speeds are less representative of the true traffic conditions, which may also pose problems with the models integrating interface accelerations. In particular, if the macroscopic data provides average speeds that do not vary or hardly vary between the various road segments, taking account of the interface accelerations is no longer sufficient for correct energy consumption prediction.

That is precisely why the invention also enriches the road network data by integrating the speed perturbations induced by critical elements of the road infrastructure.

The dynamic model of the invention can follow more precisely the consumption variation trends. The energy consumption assessment error in relation to the reference is approximately 9%.

The invention claimed is:

1. A method of determining a route of travel minimizing energy consumption of a vehicle travelling on a road network having road segments comprising steps of:
   a) identifying a current identified position and a destination of the vehicle;
   b) constructing a dynamic model of the vehicle that relates the energy consumption by the vehicle to acceleration of the vehicle;
   c) constructing a line graph of the road network including vertices with a line graph arc representing each vertex of the road network, the line graph arcs being located between the current identified position of the vehicle and the identified destination of the vehicle;

d) determining the energy consumption by the vehicle on each line graph arc by:
  i. dividing each line graph arc into two phases of travelling with a first phase at a constant average speed of traffic related to a considered line graph arc and with a second phase of travelling with acceleration in the considered line graph arc by switching from a previous constant average speed of traffic of a previous line graph arc of the considered line graph arc to the constant average speed of traffic in the considered line graph arc; and
  ii. using the dynamic model of the vehicle and the constant average speed and acceleration of each phase on each line graph arc to determine the energy consumption by the vehicle on each line graph arc, wherein energy consumption $E_{jump,i}$ associated with speed fluctuation between two line graph arcs is defined as follows:
  $E_{jump,i} = \int_0^{t_{jump,i}} (\tilde{P}_{b,i} + P_{aux}) dt$ t with $\tilde{P}_{b,i}$ being the power demand at the battery for the acceleration phase to shift from speed $\overline{v}_{i-1}$ to speed $\overline{v}_i$ and Paux being power requested by auxiliaries and $t_{jump,i}$ being time required for speed fluctuation for segment i, the power demand being obtained from a vehicle traction force on a wheel defined as: $\tilde{F}_w = m \cdot a + a_2 v(t)^2 + a_1 v(t) + a_0$, m being the vehicle mass, a0, a1, a2 being parameters identified for the vehicle, wherein the time-varying speed v(t) in each transient is linearly modelled as follows:
  $v(t) = \overline{v}_{i-1} + \text{sign}(\overline{v}_i - \overline{v}_{i-1}) \cdot a \cdot t$ where $\overline{v}_{i-1}$ is the previous constant average speed on the previous line graph arc, $\overline{v}_i$ is the constant average speed on the considered line graph arc and a is the constant acceleration for achieving the speed change;

e) determining the route between the current identified position of the vehicle and the identified destination of the vehicle by using a shortest path algorithm which minimizes the energy consumption determined in the line graph arcs, the shortest path algorithm accounting for a negative energy consumption on at least one line graph arc and wherein the line graph is constructed with steps of:
  i. constructing a directed graph of the road network including directed graph nodes and directed graph arcs with the directed graph nodes corresponding to vertices within the road network and the directed graph arcs corresponding to roads connecting the vertices within the road network; and
  ii. constructing the line graph of the road network with nodes of the line graph corresponding to each directed graph arc, and the line graph arcs corresponding to adjacencies between each directed graph arc; and wherein
   each line graph arc contains information of a directed graph arc and of an upstream directed graph arc.

2. The method as claimed in claim 1, wherein the first and the second constant average speeds of the vehicle and the acceleration of the vehicle are determined from at least one of traffic conditions, topology and infrastructures.

3. The method as claimed in claim 2, wherein the traffic conditions are obtained in real time through communication with online data services.

4. The method as claimed in claim 2, wherein the traffic conditions are stored in a historical data storage.

5. The method as claimed in claim 2, wherein the topology of the road network is determined by geolocation.

6. The method as claimed in claim 1, wherein the line graph is constructed using a topology of the road network.

7. The method as claimed in claim 1, wherein the dynamic model of the vehicle depends on intrinsic parameters of the vehicle.

8. The method as claimed in claim 7, wherein the intrinsic parameters of the vehicle are obtained from a database or transmitted by a user.

9. The method as claimed in claim 1, wherein the route is displayed on a screen of a geolocation system, a smartphone, on a dashboard of the vehicle or on a website.

10. The method as claimed in claim 1, wherein the dynamic model of the vehicle depends on a predicated power request of at least one auxiliary system of the vehicle.

11. The method as claimed in claim 10, wherein the predicated power request of at least one auxiliary system depends on outside temperature.

12. The method as claimed in claim 1, wherein the shortest path algorithm is a Bellman-Ford algorithm.

* * * * *